United States Patent
Kothari et al.

(10) Patent No.: US 10,349,777 B2
(45) Date of Patent: Jul. 16, 2019

(54) MODULAR HOLDING BIN WITH POWER RECOVERY MODE

(71) Applicant: PRINCE CASTLE LLC, Carol Stream, IL (US)

(72) Inventors: Ajay Ramniklal Kothari, Naperville, IL (US); Herman Borkhovik, Prairie View, IL (US); Paul Gerard Touchette, Naperville, IL (US)

(73) Assignee: PRINCE CASTLE LLC, Carol Stream, IL (US)

( * ) Notice: Subject to any disclaimer, the term of this patent is extended or adjusted under 35 U.S.C. 154(b) by 97 days.

(21) Appl. No.: 15/297,128

(22) Filed: Oct. 18, 2016

(65) Prior Publication Data

US 2018/0103802 A1   Apr. 19, 2018

(51) Int. Cl.
*A01K 43/00* (2006.01)
*A47J 39/00* (2006.01)
*A47J 39/02* (2006.01)

(52) U.S. Cl.
CPC ............. *A47J 39/006* (2013.01); *A47J 39/02* (2013.01)

(58) Field of Classification Search
CPC .................................. A47J 39/02; A47J 39/00
USPC ............................................. 426/231; 99/483
See application file for complete search history.

(56) References Cited

U.S. PATENT DOCUMENTS

| | | |
|---|---|---|
| D63,818 S | 1/1924 | Curtiss |
| D243,362 S | 2/1977 | Shumrak et al. |
| D341,054 S | 11/1993 | Maputol |
| D369,269 S | 4/1996 | Labadia Del Fresno |
| 5,783,803 A | 7/1998 | Robards, Jr. |
| 5,900,173 A | 5/1999 | Robards, Jr. |
| D434,265 S | 11/2000 | Tatlow |
| 6,412,403 B1 | 7/2002 | Veltrop |
| 6,637,322 B2 | 10/2003 | Veltrop |
| 6,658,994 B1 | 12/2003 | McMillan |
| 6,878,391 B2 | 4/2005 | Veltrop |
| 6,884,451 B2 | 4/2005 | Veltrop |
| 7,105,779 B2 | 9/2006 | Shei |
| 7,328,654 B2 | 2/2008 | Shei |
| 7,385,160 B2 | 6/2008 | Jones |
| 7,762,636 B2 | 7/2010 | Veeser et al. |
| 7,858,906 B2 | 12/2010 | Veltrop et al. |
| 8,091,472 B2 | 1/2012 | Maciejewski et al. |
| 8,096,231 B2 | 1/2012 | Veltrop et al. |
| D716,095 S | 10/2014 | Veltrop et al. |

(Continued)

FOREIGN PATENT DOCUMENTS

WO   WO-03/037150 A1   5/2003
WO   WO-2013062832 A1   5/2013

OTHER PUBLICATIONS

Anonymous, "mal wieder RS 485 and Multimaster—Mikrocontroller. net", retrieved from the Internet: <https://www.mikrocontroller.net/topic/28714> (2005).

(Continued)

*Primary Examiner* — Ahshik Kim
(74) *Attorney, Agent, or Firm* — Marshall, Gerstein & Borun LLP

(57) ABSTRACT

A modular food holding bin has multiple food holding units or bins, which can be connected and disconnected from each other in multiple different configurations. Each bin can be set to its own temperature, independently of the others. The modular holding bin includes a power recover mode.

13 Claims, 13 Drawing Sheets

(56) References Cited

U.S. PATENT DOCUMENTS

| | | | |
|---|---|---|---|
| D725,429 S | 3/2015 | Veltrop et al. | |
| 9,976,750 B1* | 5/2018 | Kestner | F24C 7/043 |
| 2001/0007322 A1 | 7/2001 | Shei et al. | |
| 2003/0118706 A1 | 6/2003 | Veltrop | |
| 2004/0016241 A1 | 1/2004 | Street et al. | |
| 2004/0020915 A1 | 2/2004 | Shei | |
| 2005/0211696 A1 | 9/2005 | Adamski | |
| 2007/0080223 A1 | 4/2007 | Japuntich | |
| 2007/0214288 A1 | 9/2007 | Wehrle et al. | |
| 2008/0023462 A1 | 1/2008 | Shei et al. | |
| 2008/0302778 A1 | 12/2008 | Veltrop et al. | |
| 2009/0100198 A1 | 4/2009 | Zatelman et al. | |
| 2009/0266244 A1 | 10/2009 | Maciejewski et al. | |
| 2011/0119405 A1 | 5/2011 | Parr et al. | |
| 2011/0253698 A1 | 10/2011 | Theodos et al. | |
| 2011/0253703 A1 | 10/2011 | Theodos et al. | |
| 2012/0079699 A1 | 4/2012 | Veltrop et al. | |
| 2012/0261426 A1* | 10/2012 | Tomczyk | A47J 39/02 |
| | | | 220/592.01 |
| 2014/0263269 A1 | 9/2014 | Veltrop et al. | |
| 2015/0201749 A1* | 7/2015 | Turner | A47B 31/02 |
| | | | 62/3.61 |
| 2015/0327726 A1 | 11/2015 | Betzold et al. | |

OTHER PUBLICATIONS

European patent application No. 17196995.9, Extended European Search Report, dated Mar. 9, 2018.
"Modular Holding Cabinets", Product Catalog, Carter-Hoffmann, Mundelein, Illinois (Jan. 2014).

* cited by examiner

MODULAR HOLDING BIN WITH POWER RECOVERY MODE

FIELD OF THE INVENTION

The present disclosure generally relates to methods for controlling module holding bins used in a food facility and, more particularly, to providing a power recovery mode for a modular holding bin.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Food warming units, which are also known as food holding ovens or food holding bins, are used in the food industry to keep pre-cooked foods hot until they are used. Such ovens and food warming apparatus allow precooked food items to be stored separately until needed. By way of example, when a fast-food restaurant receives an order for a sandwich, the sandwich is typically assembled on a food preparation table where the contents of certain sandwich items, a hamburger patty for example, can be removed from food warning units. Storing precooked foods in food warming units thus enables quick sandwich assembly and efficient order fulfillment.

Prior art food holding ovens come in various fixed sizes but are not reconfigurable once they are installed. Such fixed-sized units thus limit food preparation layouts, which may change over time or have to be modified or altered for numerous reasons. For example, as restaurants add or change menus items, food preparation layouts might need to be adjusted. Fixed dimensional heating units limit the degree to which the food preparation layouts may be reconfigured.

Similarly, when a restaurant kitchen is remodeled existing fixed ovens and food warming apparatus might not be properly sized for the reconfigured kitchen. This can necessitate having to purchase one or more new ovens or warming apparatus at considerable expense or necessitate an undesirable or inefficient kitchen layout. Current food holding bins/ovens and warming units are not reconfigurable. A need exists for a more flexible apparatus.

As food warming units are deployed in increasing numbers, power outages have become an problem, especially in geographic locations where power grid infrastructure is lacking. In some locations around the world, fast-food restaurants can experience multiple power outages in a day. Each power outage has the potential of destroying food. When the power goes out, the holding modules heating food stop working, and the food can spoil as a result.

Another issue facing food warming units is the prevalence of these units across wide geographic expanses and the lack of remote access to these units. The result is that any time substantial modifications need to be made to a food warming unit, a technician must come out and physically modified the unit on the spot. There is no ability to provide a streamlined centralized programming functionality.

SUMMARY OF THE INVENTION

In accordance with an example, in a modular food holding bin having a plurality of individually addressable and individually controllable food holding units, a computer-implemented method of power recovery, the method comprises: upon power recovery from a power fault condition, determining, in a power recovery module of a master base controller, a time associated with the power recovery, the master base controller being a processing device coupled to control the plurality of food holding units; determining, in the power recovery module, a fault time indicating an amount of lost time between the power fault condition and the power recovery; in response, to the fault time determination, determining a timer status for each of the food holding units; for the food holding units determined to have an expired active timer status after the power recovery, the master controller sending a food expiration instruction to the food holding units; and for the food holding units determined to have an active time status after the power recovery, the master controller sending an updated operating instruction to the food holding units, the updated operating instruction including timing data for completing a recipe on the food holding units.

In accordance with another example, a modular food holding bin apparatus comprises: a plurality of individually controllable and individually configurable food holding units: a master base controller coupled to each of the plurality of food holding units through a communication bus architecture, the master base controller, the master base controller having at least one processor and at least one memory; the master base controller being configured to: upon recovery of power after a power fault condition, determine, in a power recovery module of the master base controller, a time associated with the power recovery, the master base controller being a processing device coupled to control the plurality of food holding units; determine, in the power recovery module, a fault time indicating an amount of lost time between the power fault condition and the power recovery; in response, to the fault time determination, determine a timer status for each of the food holding units; and for the food holding units determined to have an expired active timer status after the power recovery, send a food expiration instruction to the food holding units; and for the food holding units determined to have an active time status after the power recovery, send an updated operating instruction to the food holding units, the updated operating instruction including timing data for completing a recipe on the food holding units.

DETAILED DESCRIPTION

Figure 1:
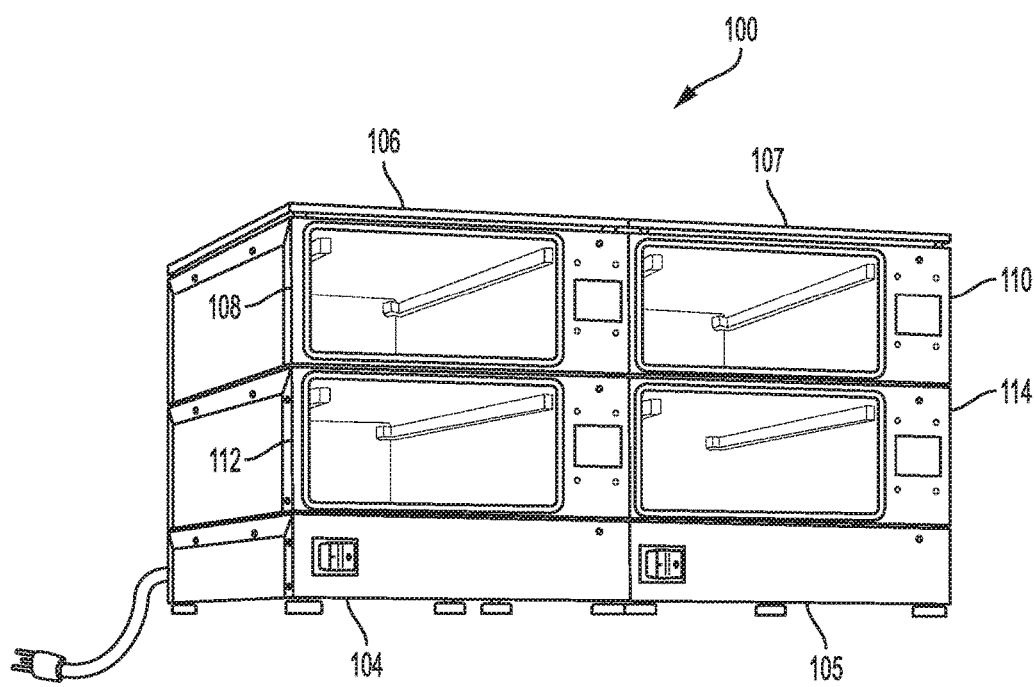
FIG. 1 illustrates a modular holding bin with four modular holding units.

FIG. 1 illustrates a modular holding bin 100, which is an example device that includes a first base unit 104, a second base unit 105, a first top cover 106, a second top cover 107 and four modular holding units 108, 110, 112, and 114. The modular holding units 108, 110, 112, and 114 are also referred to interchangeably herein as food holding bins or holding modules and heating modules and heating units. A modular heating bin contains one or more of these heating units in various stacked columns and/or rows, depending on the configuration. While the phrase heating unit is used in examples herein, as an example of a holding module, any uses of the term heating unit herein shall include holding modules, toasting units, and refrigeration units.

Two food holding units 108, 112 on the left-hand side are vertically stacked. Of the two food holding units 108, 112 on the left-hand side, the lower one of them (food holding unit 112) is stacked above and attached to the first base unit 104.

Two food holding units 110, 114 on the right-hand side are vertically stacked. Of the two food holding units 110, 114 on the right-hand side, the lower one of them (food holding unit 114) is stacked above and attached to the second base unit 105.

Figure 2:
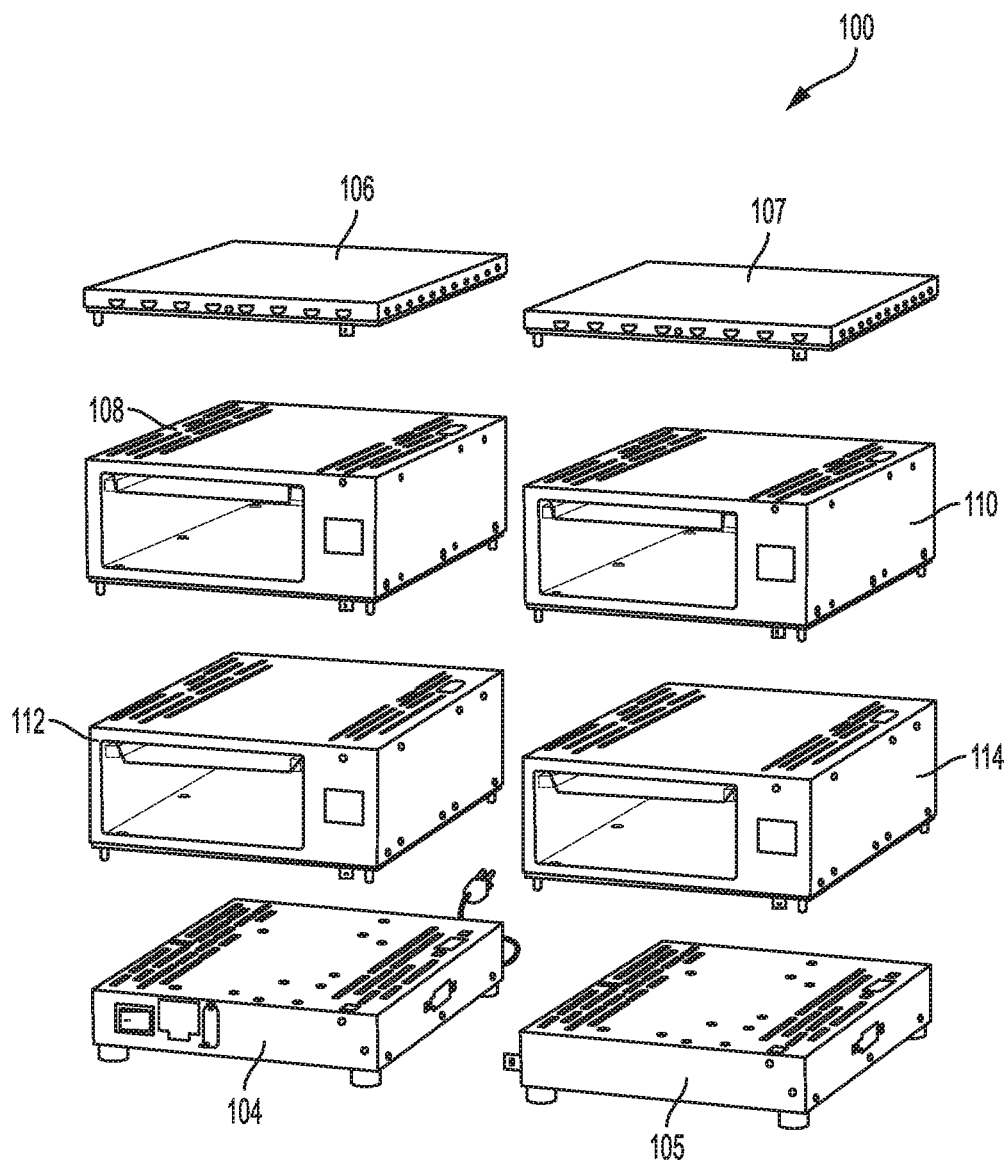
FIG. 2 illustrates modular holding units in various different positions for an unassembled modular holding bin.

The food holding units 108, 110, 112, and 114 may be functionally equivalent to prior food holding cabinets in the sense that they provide heat energy to pre-cooked food products placed into the food holding units. Other example food holding units are described in U.S. application Ser. No. 14/278,549, entitled, "Modular Food Holding Cabinet Having Individual Configurable Food Holding Units," filed May 15, 2014, the entire disclosure of which is hereby incorporated by reference. The food holding units 108, 110, 112, 114 are therefore electrically and mechanically connected to a base unit and covered. More particularly, food holding units 108 and 112 are connected to base unit 104; food holding units 110 and 114 are connected to base unit 105. Food holding units 108 and 112 are covered by the first cover 106; food holding units 110 and 114 are "covered" by the second top cover 107. As shown in FIG. 2, however, the food holding units can be physically disconnected from each other and reconnected in different configurations. Of the many differences between the food holding units 108-114 and previous food holding units, differences based on an entirely new bus protocol and architecture, the food holding units each include a touchscreen display to the right of the holding region configured to receive a slidable food container. Each touchscreen display can be used to depict instruction signals to an operator, and each touchscreen display can be depressed to activate certain functions, for example, to activate a timer for the holding unit.

FIG. 2 is a partially exploded view of the modular holding bin 100 shown in FIG. 1. FIG. 2 illustrates what is referred to herein as a "2×2" arrangement of four food holding units 108, 110, 112, and 114.

The four modular heating bins 108, 110, 112, and 114 can be disconnected and reconnected to each other in different physical configurations yet have each unit retain different corresponding functionalities, so long as their configuration provides an electrical pathway through at least one unit 108, 110, 112, 114 to a master controller located in the base unit 104. By way of example, the units can be arranged as shown in FIG. 1 with two columns and two rows of modular heating bins. Four units can also be arranged such that there is one column of four, vertically-stacked modules or one horizontal row of four, horizontally-aligned modules. Four units can also be arranged such that there is a one column of three modules stacked vertically and one module in another column. With the bus protocols herein, any configuration of units/modules may be used across columns and rows. Other numbers of units/modules can be arranged in different configurations as long as they are all linked to the base unit 104, for example, 2, 4, 6, 8, or greater numbers of units/modules, and including odd numbers of units as well.

Figure 3:
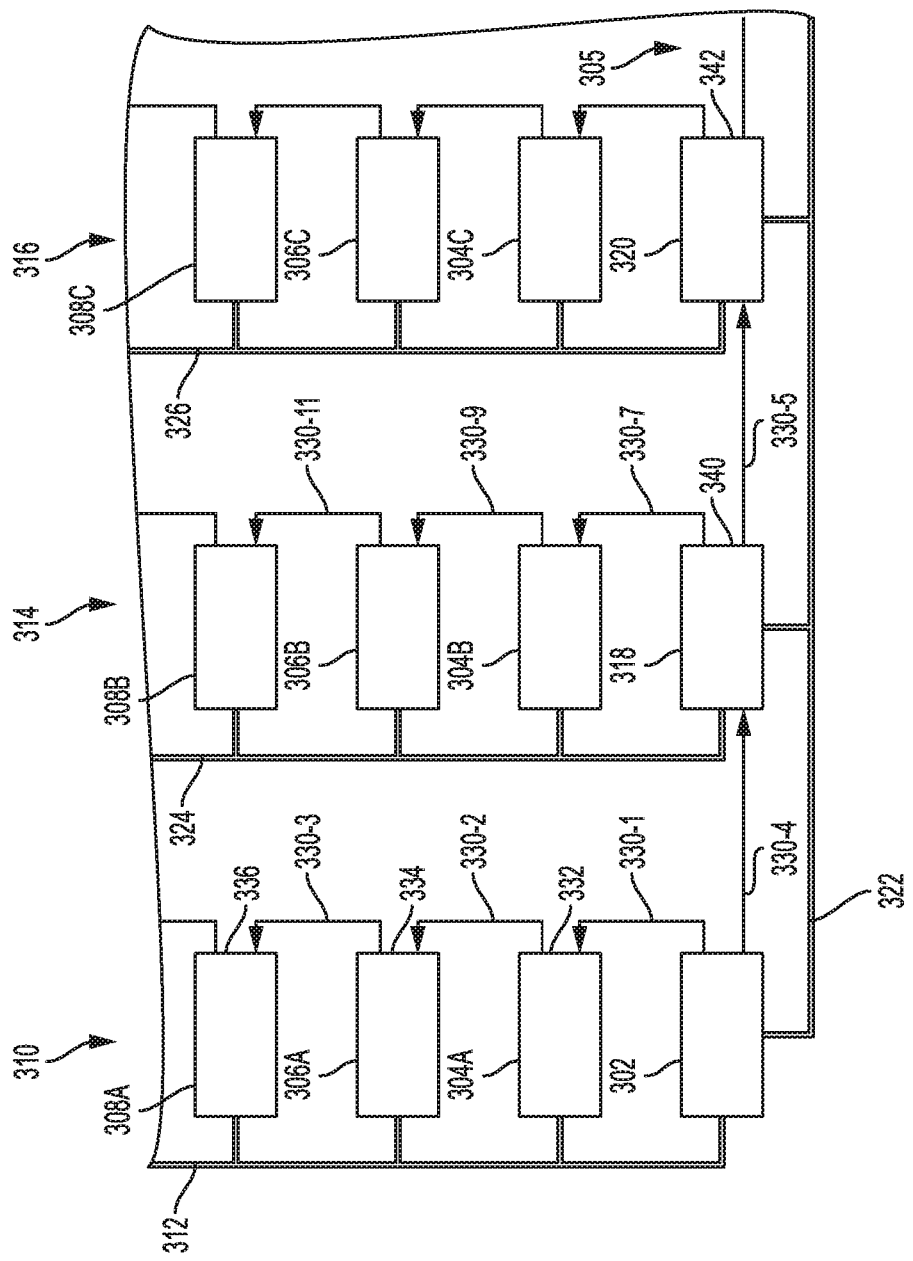
FIG. 3 depicts several modular holding units operatively coupled to a master controller through a network that comprises other modular holding units, communications busses and single, interrogation wires that extend between physically-adjacent devices.

The food holding units 108, 110, 112, 114 are individually addressable and individually controllable from the base unit 104 in the modular holding bin 100. The individual addressability and individual controllability is provided by a unique network 300 that connects the food holding units 108, 110, 112, 114 to the base unit 104. The topology of the network 300 is depicted in FIG. 3.

As used herein, the term bus refers to a conductor, or group of electrically-parallel conductors, that serves as a common connection for two or more circuits.

The modular heating units herein may employ a multi-master, multi-point communication bus protocol to form the system bus and the peripheral busses 1-N, described herein. An example multi-master bus is the so called Controller Area Network (also termed herein "CAN"). CAN is a bus-based standard (or protocol) that allows devices, including microcontroller devices to communicate over a bus. Example CAN versions include CAN 2.0A and CAN 2.0B (available from Bosch corporation), which collectively describe Open System Interconnection (OSI) layers from the physical layer to the application layer, and which are also described in International Organization for Standardization (ISO) standard ISO 11898, which includes so called high speed CAN and low speed CAN implementations, among other descriptions. As used in the present description, references to a communication bus shall include a CAN communication network bus.

The CAN bus uses a two differential signal inputs ("CAN high" & "CAN low" signal inputs). These differential signal inputs aid in reducing electrical signal noise inherent in the system to coupling on to the CAN bus. In addition, the topology of the CAN bus allows any device to talk on the bus at any time, in part because of the multi-master bus architecture of a CAN bus communication. The CAN busses, as further described below, may include a CAN system communication bus between a master base controller and expansion bases. The CAN busses may further include at least one CAN peripheral communication bus for each column (referred to as peripheral busses 1 through N, where N refers to the number of peripheral busses (columns) in the system which is a design choice). Given the multi-master bus architecture, any device on any of the CAN system communication bus or any CAN peripheral communication bus can talk on the bus and/or can provide master control, to varying degrees depending on unit programming, over the system.

Referring now to FIG. 3, the network 300 comprises a master controller 302 (also termed a "master base controller" or a "main base controller") operatively connected to a matrix of "slave" food holding units that can be arranged in columns and rows as shown in FIG. 2. In FIG. 3, food holding units 304A, 306A and 308A as well as the master controller food holding unit 302, comprise a first vertical "column" 310 of units stacked on top of each other. Units 304A, 306A and 308A are physically supported by and electrically coupled to the master controller 302.

The food holding units 304A, 306A and 308A are communicatively coupled to the master controller 302 by way of a "peripheral" communication bus 312 that extends between the master controller 302 and the food holding units 304A, 306A and 308A. In addition to being coupled to the master controller by the bus 312, the first unit 304A is also coupled to the master controller through an interrogation signal wire 330-1. The interrogation signal wires are used during an initial power on mode of the holding bin 100 to dynamically identifying the connected holding units and provide those uses with addresses for use in communication with the master controller. Upon an initial power on of the holding bin 100, a signal is sent on the interrogation signal wire and that signal is detected by a food holding unit to which the wire is connected. The reception or detection of a "signal" on the wires 330-1-330-n, gives permission to the food holding unit receiving the signal to respond by sending responses messages onto a peripheral communication bus to which the food holding unit is connected, e.g., the peripheral bus 312. In power on mode, for example, the master controller 302 sends an interrogation signal on the wire 330-1 to the holding unit 304A, after which the holding unit 304A transmits onto the communication bus a request signal to the main base controller, e.g., master controller 302, that the food holding unit to which the interrogation signal wire is attached, is waiting for an address to be assigned to it by the main base controller.

Still referring to FIG. 3, the second food holding unit 306A in the first column 310 is coupled to the first food holding unit 304A through a second interrogation signal wire 330-2. The third unit 308A in the first column 310 is coupled to the second unit 306A through a third interrogation signal wire 330-3. The signal wires 330-1, 330-2 and 330-3 are not connected to each other but, in the illustrated example, extend only between adjacent food holding units as shown in FIG. 3. The column 310 (as well as the other columns) is shown in FIG. 3 as extending upward, indicating that additional holding units may be positioned in any one or more rows.

FIG. 3 also shows a single horizontal row 305 of expansion base control units 318 and 320, which are laterally-adjacent to the master controller 302 and coupled to the master controller 302 via a communications bus 322, which extends between only the master controller 302 and the expansion control units 318, 320. This will form the "system" communication bus. The peripheral bus 312 expands in length as additional holding units are attached along a give column. Similarly, the system bus 322 expands in length as more expansion base control units are attached to the control row. The expansion control units 312 and 320 serve as "slave" control units to the master controller 302.

In addition to being coupled to the master controller 302 via a systems communications bus 322, the "first" expansion base control unit 318 is coupled to the master controller 302 by way of an interrogation signal wire 330-4 that extends between only the master controller 302 and the first expansion base control unit 318. A second interrogation signal wire 330-5 extends between the first expansion base control unit 318 and the second expansion base control unit 320. The single row 305 thus comprises the master controller 302 and several, horizontally-connected expansion base control units 318, 320, so named because they receive commands sent to them from the master controller 302 and respond accordingly but are also able to act as "master" controllers to food holding units stacked above them.

The row 305 is depicted in FIG. 3 as extending to the "right" of the master controller 302. The number of units in a column and the number of units in rows is a design choice. The system can be extended vertically and horizontally with columns to the right of the master controller 302.

The master controller 302 controls the food holding units 304A, 306A and 308A that are arranged in the "first" peripheral communications bus vertical column 310. The control of those vertically-stacked food holding units is accomplished by the master controller 302 assigning a unique address to each of unit 304A, 306A and 308A such that bi-directional communications can take place between the master controller 302 and a slave food holding units 304A, 306A, 308A using the first peripheral communication bus 312, which is a multipoint multi-master communications bus.

Upon initial power on, the master controller 302 enters a power on discovery mode, in which the controller 302 detects and assigns addresses by sending a sequence of four messages exchanged between the master controller and a food holding unit located above the master controller. The first message sent to a food holding unit is a D.C. voltage applied to the interrogation signal wires that extend between adjacent food holding units. The D.C. voltage sent to a food holding unit on an interrogation signal wire 330 causes a food holding unit receiving the D.C. voltage to "wake up," or monitor the communication bus 312. After the D.C. voltage is applied to an interrogation signal wire, the food holding unit transmits a request for address message ("signal message") on the first peripheral communications bus 312 to the master controller 302. After the food holding unit transmits the address request message, the master controller transmits an address assignment message ("third message") on the peripheral bus. When the address assignment message is received by the food holding unit to which the wake up signal was sent, the food holding unit stores an address contained within the address assignment message and sends an address confirmation message ("fourth message") to the master controller 302. Thereafter, the master controller and the food holding unit, in which the address was assigned, will communicate using this unique address throughout the rest of the time the unit is powered.

In a preferred embodiment the electrical interrogation signal transmitted or applied to the wire 330-1 is a D.C. voltage, typically less than twelve volts. The first peripheral communication bus 312 is a serial bus that uses the well-known CAN communications protocol, further description of which is omitted for brevity because the CAN standard is well known.

In addition to be coupled to the food holding units 304A-308A that are vertically stacked above it, the master controller 302 is also coupled to other columns 314 and 316 of slave holding units 304B-308B and 304C-308C through horizontally-adjacent expansion bus controllers 318 and 320, which are coupled to the master controller 302 through an electrically separate communications bus 322, which is referred to as the second peripheral bus, and which are coupled to each other by D.C. voltage-carrying signaling wires 330-4 and 330-5. The peripheral busses 324 and 326 are electrically isolated communication busses.

The horizontally-adjacent expansion base controllers 318 and 320 are so named because they act as master bus controllers for vertical column of food holding units that are stacked vertically above them. The expansion base controllers 318, 320 communicate with corresponding "columns" of slave food holding units 304B-308B and 304C-308C through corresponding communications buses 324 and 326 that extend from each expansion base controller to the columnar-oriented food holding units. In FIG. 3, communication bus 312 represents the first peripheral CAN bus whereas 324 and 326 represent the second and third peripheral CAN busses, respectively.

In some examples, the expansion base controllers have reduced functionality and structure than the master base controller, e.g., by employing smaller memory, lower end processors, and less computer-executable instructions. In some examples, however, one or more of the expansion base controllers may be a master controller or having the design and capability of a master controller, which may be beneficial for power management and routing in modular holding bins having an exceedingly large system communications buses. Furthermore, in some configurations it may be beneficial to have an expansion base controller provide redundancy capabilities in the event of a failure of the master base controller. Therefore, in some implementations one or more expansion base controllers may be duplicate master base controllers storing all or some portion of the instructions stored on the master base controller.

The ability to detect if a food holding unit is at a particular column/row location is provided by a method of detecting the presence of a food holding unit that obviates the need to pre-assign or provide fixed addresses to the food holding units but instead enables the food holding units to receive unique assignment identifications when they are installed into the network 300 and powered up. The assignment of an address to a food holding unit is performed by the master base controller such that the master base controller can become aware of the presence of any food holding unit that is plugged into any location along any of the CAN communication buses 312, 322, 324 and 326. The CAN bus configuration, in particular, allows a system to more efficiently identify the holding unit configuration at initial power on and assign addresses dynamically, based on the holding unit configuration.

Thus, in the illustrated example, detecting and assigning a unique address to a food holding unit is accomplished by the network elements 302-308 asserting an interrogation signal, e.g., in the form of a DC voltage, on a wire that extends between adjacent network elements, where the receipt of the voltage at a second network element enables or permits a network element to transmit a response message on one of the communications buses 312, 322, 324 or 326.

In the example of FIG. 3, the master controller 302 is configured to detect, upon power on, the presence or absence of a food holding unit by applying a voltage to the interrogation signal wire 330-1, which extends from the master controller 302 to only the first vertical location 332 in the network 300 where a slave food holding unit might be installed. If a food holding unit 304A is installed at that first location 332, the food holding unit 304A, having been given "permission" to transmit onto the bus by the voltage on the interrogation signal wire 330-1, transmits a message onto the communications bus 312. When the message from a food holding unit is detected by the master controller 302, the controller 302 considers the response from the food holding unit to be indicative of the presence of a food holding unit at that first location 332. The master controller 302 thereafter transmits a unique address assignment message on to the communications bus 312 which is received by the food holding unit 304A at the first location 332 the receipt of which enables subsequent communications between the controller 302 and the food holding unit 304A to take place via the first peripheral communications bus 312. An address is assigned to food holding units so that subsequent communications with food holding units do not require the use of the interrogation signal wires 330-1-330-n.

The presence of the additional food holding units in the first column 310 is achieved in progressive manner, with each holding unit sending an interrogation to the subsequent holding unit connected to it through an the interrogation signal wire. The second and third holding units are dynamically addressed, as a result. For example, the food holding unit 304A at the first location 332 is configured to send a "wake up" signal on the interrogation signal wire 330-2, in response to the holding unit 304A receiving its address assignment from the master controller 302 via the peripheral bus 304A. After receiving its address assignment, the holding unit 304A assumes the role of a controller vis-à-vis the food holding unit 306A installed at a corresponding second location 334. This progressive interrogation process continues. If a second food holding unit 306A is detected at the second location 334, the second food holding unit 306A at the second location 334 assumes the role of a controller vis-à-vis a food holding unit 308A that might be installed at a corresponding third location 336.

Thus, the second food holding unit 306A is determined to be present or absent from a logically adjacent second location 334 in the column 310 by way of a DC voltage interrogation signal transmitted from the first holding unit 304A at the first location 332 on the interrogation signal wire 330-2, which extends between only the first and second locations 332, 334 in the first column 310. The voltage interrogation signal may be applied automatically using instructions stored on the holding unit 304A, e.g., instructions to automatically signal an interrogation signal in response to being assigned an address. In other examples, the holding unit 304A sends the voltage interrogation signal in response to a particular command from the master controller 302, and sent on the peripheral bus 312.

After the "first message" is transmitted to the second location 334 by the first unit 304A, the second food holding unit at location 344 sends a message onto the bus 312 to the master controller 302. If the second unit 306A is present, it will respond to the first message because the first type of message enables or authorizes the second unit 306A to respond to the master base controller's over the CAN network. The second unit 306A then sends its response to the first message over the peripheral CAN communications bus 312 to the master controller 302. That response is a request for an address from the master controller 302 and as such is considered the second message in the four message communication exchange.

The master controller 302 will thereafter transmit a third message, which is the unique address assignment message to the second food holding unit 306A at the second location 334 above the master controller 302. The address assignment message, transmitted onto the bus 312, contains a unique address that is used by the second food holding unit 306A for subsequent communications. If no response is received by the master controller 302 from the second location 334, the master controller 302 considers the second location 334 to be unoccupied. When the master controller 302 determines that the current location 334 has no food holding unit the vertical addressing for that column is now finished.

When the expansion base control unit 318 receives an address from the master controller 302, the expansion base control unit 318 thereafter becomes a pseudo-master controller to the food holding units 304B, 306B, 308B . . . , vertically stacked above and communicatively coupled to the expansion base control unit 318 via interrogation signal wires 330-7, 330-9, 330-11 and a third communications bus 324 (second CAN peripheral bus) that extends between the expansion base control unit 318 and all of the vertically stacked food holding units in the second column 314.

In order to detect whether expansion control units 318, 320 might be present in an adjacent vertical column 314, 316, the master controller 302 first asserts or transmits a first type of message (i.e., an interrogation message) on interrogation signal wire 330-4 that extends from the master controller 302 to a laterally-adjacent expansion base control unit 318, which is in turn able to communicate both vertically and horizontally as described above and hereinafter. Just as the master controller 302 does with holding units located in a first column above the master controller 302, after the interrogation message is provided to the interrogation signal wire 330-4, if an expansion base control unit 318 is in fact present at the first laterally adjacent location 340, the expansion base control unit 318 at that location will respond to the interrogation message by transmitting an address request message to the master controller 302 on the system communications bus 322. When the address request message from the expansion base control unit 318 is received by the master controller 302, the master controller 302 transmits an address assignment message to the expansion base control unit 318, again, on the system communications bus 322. Upon the receipt of the address assignment message, the expansion base control unit 318 can thereafter act as a "master" controller to food holding units located above the expansion control unit 318 and which comprise the second column 314 of food holding units. The expansion control unit 318 can perform all or only a portion of the master controller operations, depending on system design. Furthermore, the expansion control units 318, 320, etc. provide electrical and control isolation of their respective columns 314, 316, etc. As such, if one or more holding unit goes down in a column, the column may be taken off line by the corresponding expansion control unit, without affecting the operation of the other columns and other expansion control units. With a CAN bus architecture, for example, the system bus 322 can be maintained across expansion control units, even if one of the expansion control units corresponds to a column taken off line. The expansion control unit can communicate a fault condition to the master controller, and the master controller correspondingly can communicate specific fault instructions to that expansion control unit, as well as stop sending instructions addressed to holding units on the corresponding column.

In the illustrated example, the detection of food holding units 304B, 306B, 308B in the second column 314 and the assignment of addresses to them is performed by the master controller 302 using the process/method described above with respect to the master controller 302 and the food holding units 304A, 306A, 308A in the first column 310. The expansion control units 318, 320 do not assign addresses nor do they detect food holding units above them. Rather these expansion control units facilitate address assignment to by the master controller 302. That is, the illustrated example, addresses are assigned to food holding units 304B, 306B and 308B by the master controller 302 by way of messages it transmits over the systems communications bus 322 to the slave control unit 318, which passes the messages onto the second peripheral communications bus 324.

The detection of food holding units in a third column 316 of food holding units 304C, 306C and 308C and the assignment of unique addresses to them is performed in the same way that food holding units 304B, 306B and 308B are detected in the second column 314 and addresses are assigned to them. The description of the process for the third column 316 is therefore omitted in the interest of brevity. In addition columns 4-N will be discovered, addressed and communicating in the same method as described above. The number of columns is a design choice and is not limited by this method.

Figure 4:
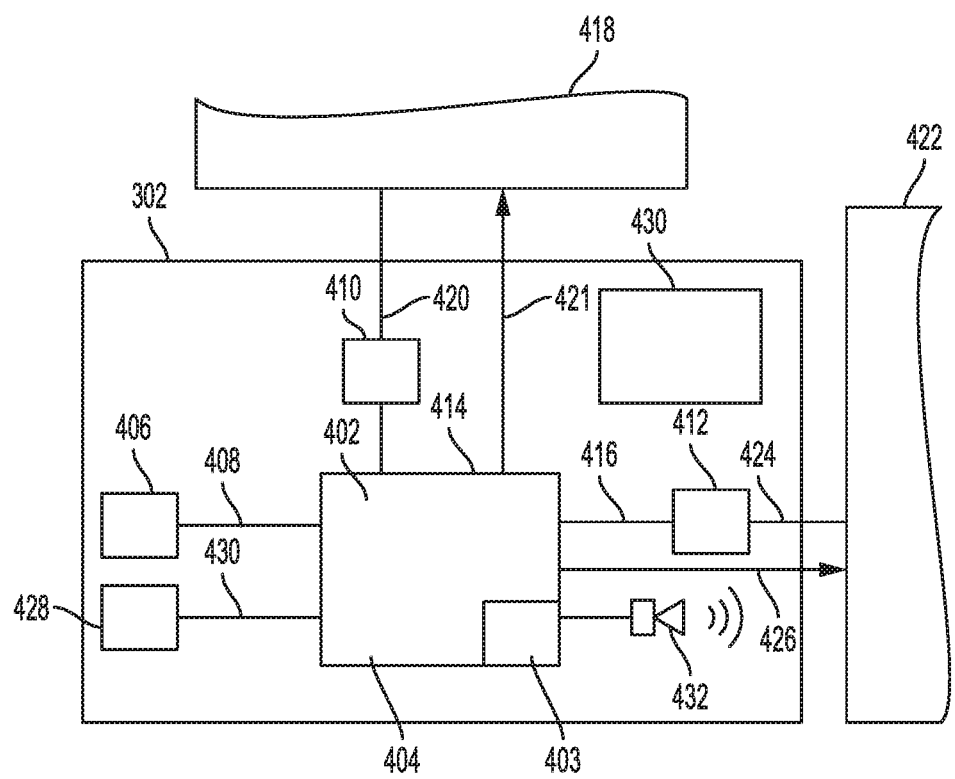
FIG. 4 is a block diagram of a master controller for a modular holding bin.

FIG. 4 is a block diagram of a master controller 302 depicted in FIG. 3. A signal-chip microcontroller 402 having non-transitory memory devices 403 co-located on the same semiconductor die 404 executes program instructions that are stored in the "on-chip" memory 403. Those instructions cause the processor 402 to perform various operations to detect the presence of logically-adjacent food holding units and communicate with them via one or more communications busses.

The processor 402 is also electrically coupled to a memory device, typically an EEPROM 406 through a conventional address/data/control bus 408. System configuration data, e.g., menus and settings, are stored in the memory device 406.

The processor 402 is coupled to two CAN-based transceivers 410 and 412, which are coupled to the processor 402 through corresponding ports 414 and 416. The first CAN transceiver 410 is coupled to a column-adjacent slave module 418, i.e., a slave module in the same column 310, through a CAN compliant communications bus 420 and an interrogation signal wire 421.

The second CAN transceiver 412 is coupled to a slave control unit 422, also referred to as an expansion base 422 through an interrogation signal wire 426 on which a voltage can be applied and a CAN-compliant bus 424.

The master controller 302 further includes a power recovery module 430, discussed further below in reference to FIG. 8.

Figure 5:
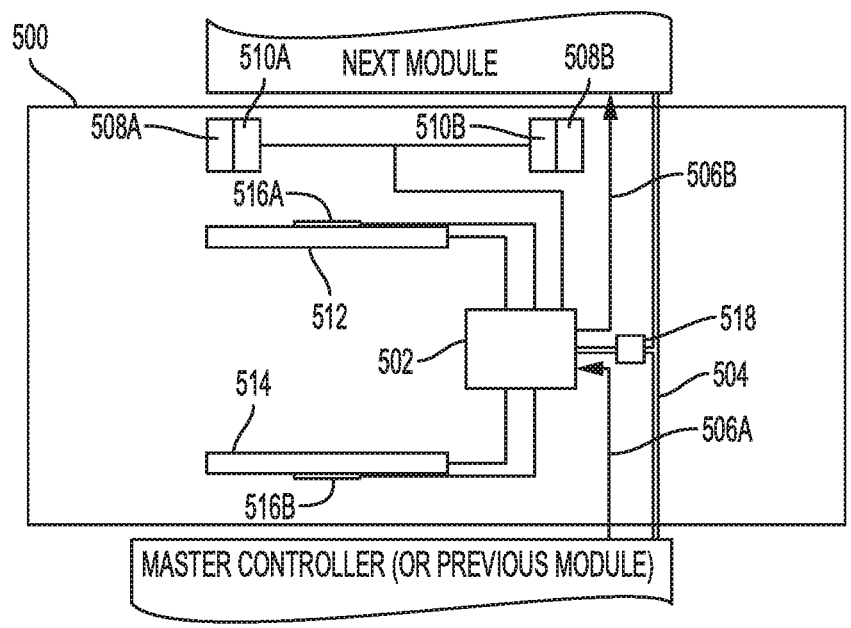
FIG. 5 is a block diagram of a modular food holding unit within a modular holding bin.

FIG. 5 is a block diagram of a food holding unit 500. Such a food holding unit would be located and operating in one of the locations 304-308 in FIG. 3. It is comprised of a microcontroller 502 coupled to either the master controller 302 or a "previous module" in the network 300 by way of a communications bus 504 and an interrogation signal line 506 on which the aforementioned "first type of message" (or interrogation message) is transmitted to the processor 502 for the food holding unit 500.

Reference numeral 506A represents an incoming interrogation signal wire or line that is connected to an input terminal of the microcontroller 502. 506B represents an outgoing interrogation signal wire or line by which the food holding unit 500 can assert the incoming interrogation signal wire of the "next module." 518 identifies a CAN transceiver, which allows the microcontroller 502 to communicate on the bus 504.

Each food holding unit 500 in a modular holding bin is provided with a capacitive type touchscreen display board 510. Upper and lower heating elements 512, 514 are controlled by the microcontroller 502 to maintain a required temperature that is assigned food to the unit 500 by the master controller 302.

Temperature sensors 516A and 516B, preferably embodied as a K-type thermocouple, which is mechanically coupled to the heating elements, the current of which is temperature-dependent, enable the processor 502 to monitor the temperature in the food holding unit 500 and apply or reduce current to the upper heaters 512 and lower heater 514 respectively.

Figure 6:
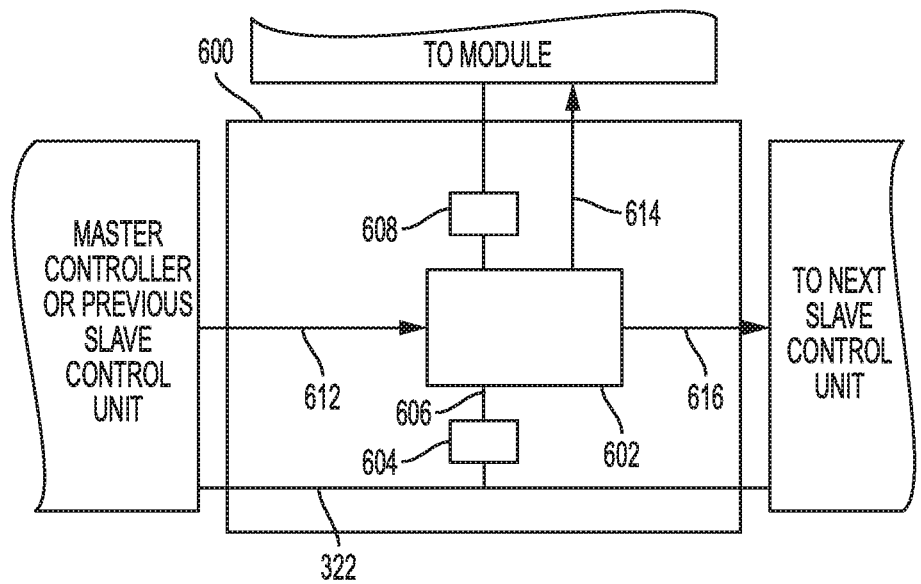
FIG. 6 is a block diagram of an expansion control unit, which enables the master controller to communicate with food holding units in different columns.

FIG. 6 is a block diagram of an expansion control unit (or slave control unit) 600, which when installed in the network shown in FIG. 3 enables the master controller 302 to communicate with slave food holding units in different columns 314 and 316. The expansion controller 600 comprises a processor 602 coupled to a CAN transceiver 604, which couples the processor 602 to a conventional address/data/control bus 606. The transceiver 604 is coupled to the systems communications bus 322. A second CAN transceiver 608 enables the processor 602 to communicate with slave food holding units located "above" the expansion controller 600 in a column.

In FIG. 6, reference numeral 612 identifies an incoming signal wire on which the aforementioned first type of message is sent to the slave control unit 600. Reference numeral 614 identifies an outgoing signal wire on which the slave control unit 600 can send the "first type of message" to a first vertical unit in a column that extends upwardly from the slave control unit 600. Reference numeral 616 is an outgoing signal wire on which the slave control unit 600 can send the "first type of message" to a horizontally-adjacent next slave control unit.

Figure 7:
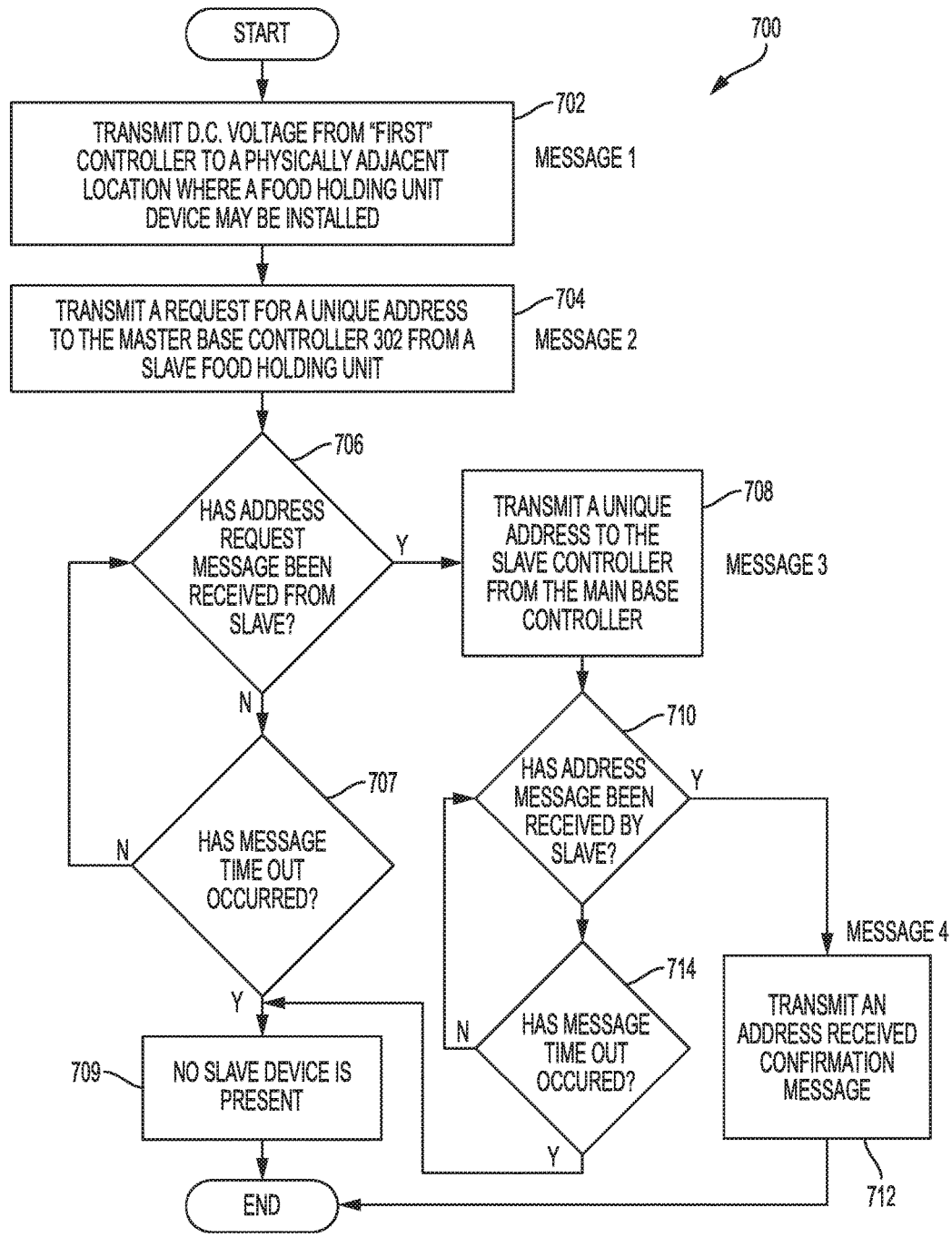
FIG. 7 is a flowchart of a method for controlling a modular food holding bin, such as the one shown in FIGS. 1 and 2.

FIG. 7 is a flowchart depicting a method 700 for providing a modular food holding cabinet, such as the one shown in FIGS. 1 and 2 and which employ a network such as the one depicted in FIG. 3 that is able to detect and control food holding units connected to each other in different configuration.

A first block 702, a "first type of message" is transmitted on a single conductor or wire that extends between a controller and a location where a device might be installed. In a preferred embodiment such a message is simply a DC voltage applied to the wire. In an alternate embodiment, however, such a signal could just as well be an AC voltage, the magnitude and frequency of which can be selected as a design choice. Serial data could also be transmitted. As stated above, the first type of message gives a receiving food holding unit "permission" to transmit onto a communications bus.

After the "first type" of messages transmitted on the wire connecting the controller to a slave unit location. At the next block 704, if a slave unit is present, a request for address message is transmitted from the slave controller to master controller. If a slave unit was present when the voltage on the first wire was asserted and detected, the slave unit sends the address request message to the master base controller. At block 706, the master base unit will determine if the message sent via block 704 was received by the master controller 302. The process 700 continues to look for the address request message until a timeout occurs as determined by the block 707, at which point the process 700 determines that no additional holding unit is present, via block 709, and the process ends.

Upon the main base controller's receipt of the address request message, sent via block 704, the master controller transmits a unique address to the slave unit requesting the address at block 708. If the message is received at the slave holding unit, block 710, then the slave holding unit stores the assigned address and sends an address confirmation message to the master controller via block 712. Thereafter, the slave unit and the controller will communicate with each other using this address, for example, in header data communicated on the peripheral and system busses. After assignment of the addresses, the process 700 may stop or control may be passed to block 702 to search for further slave controllers, in accordance with the techniques described herein. The process 700 further includes a timeout, via block 714, that ends the process if the slave holding unit never receives the address assignment from the master controller, in which case control is passed to block 709, and the process ends.

In examples herein, interrogation signal wires may be electrically isolated from one another and from the CAN peripheral and CAN system busses.

The various communications buses are also electrically isolated from one another, namely the peripheral and system busses. This isolation provides considerable advantage as modular holding bin systems increase in size to including numerous columns of holding units. The modular holding bin architecture is able to extend the system bus to include the addition of new expansion control units but while still maintaining isolation of the peripheral bus for each expansion control unit. As a result, any column of holding units can be taken offline, including the column assigned to the master base controller, and the other columns may be maintained under normal operation.

Those of ordinary skill in the computer network art know that a media access control address (MAC address) is a unique identifier that is assigned to each network interface for communications on a physical network. MAC addresses are used as a network address for most IEEE 802 network technologies as well as Ethernet networks. They enable each device on a network to be communicated with individually.

The method and apparatus described above enable food holding units in a modular food holding bin (e.g., cabinet) to be uniquely addressable and controllable over a bus, without requiring the food holding unit to be manufactured or constructed with a unique hardware address, similar to a MAC address. The food holding units are instead manufactured without an address pre-assigned to them. A food holding unit is instead assigned a unique address, functionally equivalent to a MAC address, each time it is installed into the modular holding cabinet and powered on. A food holding unit can thereafter be re-assigned new addresses, each time the power is cycled on in the holding bin system. The food holding units can thus be reconfigured as needed and re-used in different configurations.

In some examples, a modular holding bin will have a master controller that includes a power recovery mode that allows the modular holding bin to recover operations in the event of a loss of power, thereby maximizing a customer's chances of retaining food and product within the heating device without prematurely disposing of such food or product in response to a power failure. FIG. 8 illustrates an example power recovery module 800 that may be implemented as the power recovery module 430 of the master controller 302.

Generally speaking, modular holding bins are commonly used in food environments, such as restaurants and fast food restaurants in particular, to keep precooked food safe and edible from the time when it is cooked until it is provided to the customer. The main parameters that holding modules (units) observe are time and temperature. However, other parameters such as humidity can be considered. Because holding modules are electronically controlled devices, if the power is lost during a hold cycle, without appropriate tracking of the conditions, it can be difficult to impossible determine if the food in the holding modules is still good when the power is restored. Due to the safety and quality concerns, often food is discarded regardless of its true condition. This problem is exacerbated in countries and communities where power is often lost 5-50 times daily, due to lacking power infrastructure.

The power recovery module 800 is able to manage recovery of a modular holding device after a power loss, whether that loss is unintentional or due to an intended powering off of the modular holding device. Moreover, the power recovery module 800 is able to provide power recovery in response to power loss to an entire modular holding device, such as the modular holding bin 100, or in response to power loss to any of the units (304-308) contained within the modular holding unit (100).

Figure 8:
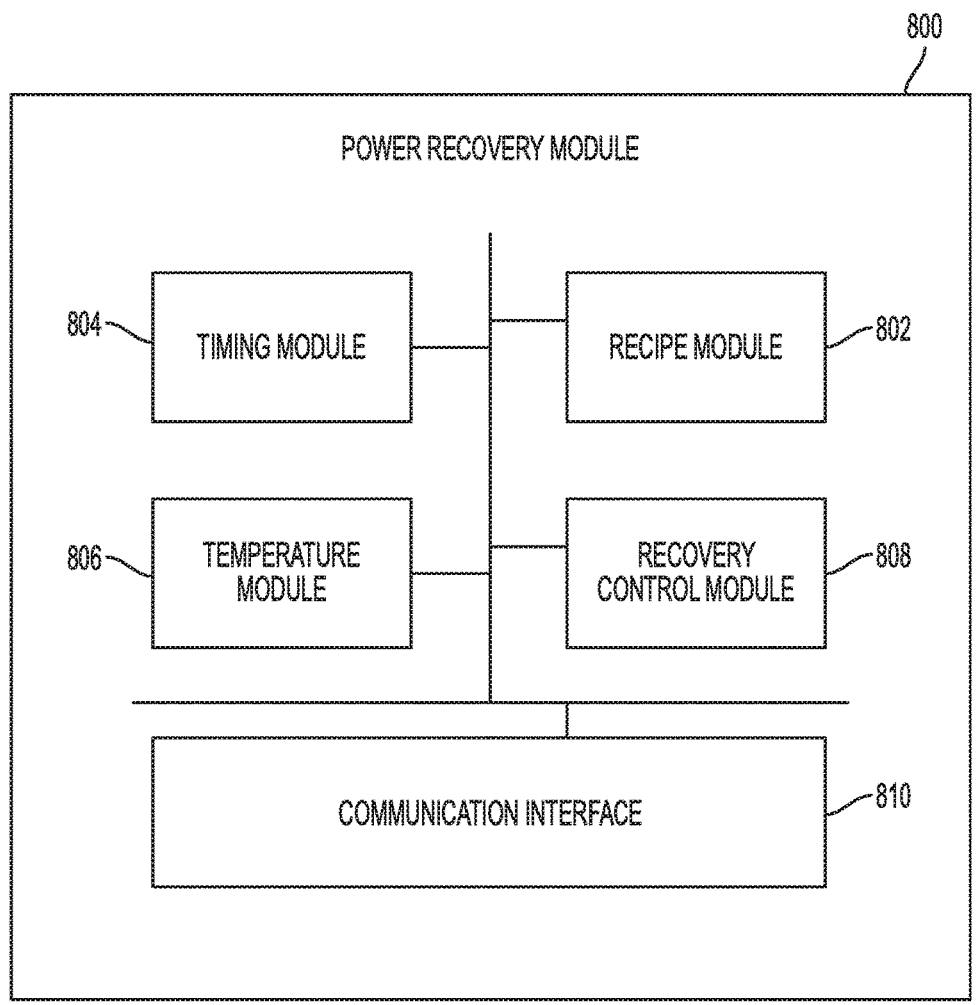
FIG. 8 is a block diagram of a power recovery module as may be implemented by the master controller of FIG. 4.

In the example of FIG. 8, the power recovery module 800 includes recipe module 802 a timing module 804, a temperature module 806, and recovery control module 808.

The recipe module 802 stores food processing instruction data, also termed herein recipe data. This recipe data may include the operating set points for the upper and lower heaters (such as 512 and 514, respectively) of a holding module. These temperature set points partly define the normal operating conditions for each of the holding modules, where different modules are programmed to different temperature set points based on the type of food to be heated in the respective module. The recipe data further includes a food or product identifier type (such as meat, poultry, fish, egg, bread, liquid, etc.).

The recipe data further includes a timing data, such as the current time remaining on a recipe being active in a holding module. This timing data may be dynamically updated through communications on the CAN peripheral and CAN system busses. For example, an initial recipe may include temperature set points of 150° F. and 160° F. for the upper and lower heater elements, respectively, and a food identifier of "meat" and a total heating time, or total cooking time, of 7 minutes. The module 802 stores that recipe data for a particular holding module. Once an operator activates that holding module, i.e., places meat in the module and presses a start button, the holding module sends a start cooking (or start recipe) signal to the master controller, where that signal is transmitted over the CAN peripheral bus and indicates that a holding unit event has started. For example, at the time that the start button is pressed to start the timer on any holding module 304-308, a start cooking signal is sent to the master controller 302, which then writes a reference clock value to one of the attributes of that specific holding module that is stored in the timing module 804 of the master controller. This process of recording a reference clock is done for any holding module in the modular holding bin at any time a timer has been started on the holding module user interface.

The reference clock stored at the timing module 804 can be generated a number of different ways. In some examples, the master controllers include electronics that keep a battery-backed running clock or timer that is continually running since the master controller has been functioning. In some examples, that means the master controller has a running clock/timer since factory completion. That clock/timer may be powered by an alternate power source, such as an internal battery in the master controller, that is separate from the power supply providing powered operation of the modular holding bin. This reference clock/timer keeps a running time that is used to timestamp data received from holding modules as they execute their recipes. In these examples, the reference clock/timer indicates a lifetime of the modular holding bin (or master controller thereof). The stored reference clock data may contain seconds data, minute data, etc. or the reference clock data may contain a numerical number indicative of seconds data, minute data, etc. The recovery control module 80 and timing module 804 may reference this timing data at any time the modular holding bin is powered on, although the clock/timer will be running even with a power is off, due to its alternative power source.

During operation of the holding modules (e.g., holding units 304-308), the remaining time for each executing recipe is periodically communicated from the holding module to the master controller, which stores this remaining time value in the timing module 804. The holding modules may be configured to transmit their remaining time each minute on the CAN peripheral bus to the master controller, for example. The timing module 804 may store that remaining time value as an attribute field of the stored recipe data for each active holding module. Further the timing module 804, upon receiving that remaining time value may store that timing data with a time stamp from the reference clock/timer, providing a global time to when the remaining time data was stored. The process repeats until the timer expires for the respective holding module.

Thus as shown, in some examples, the timing module 804 stores the total hold time for a recipe to be executed by a given holding module. The timing module 804 stores a reference (or global) relative timer value that is based on a clock external to the recipe executing (or to be executed) by a holding module. The timing module 804 further stores a log of system timer values, i.e., the received timing data, for each holding module reporting to the master controller during execution of a recipe. Further still, the timing module 804 includes data identifying all running timers (and corresponding holding modules) in the modular holding bin.

Figure 9:
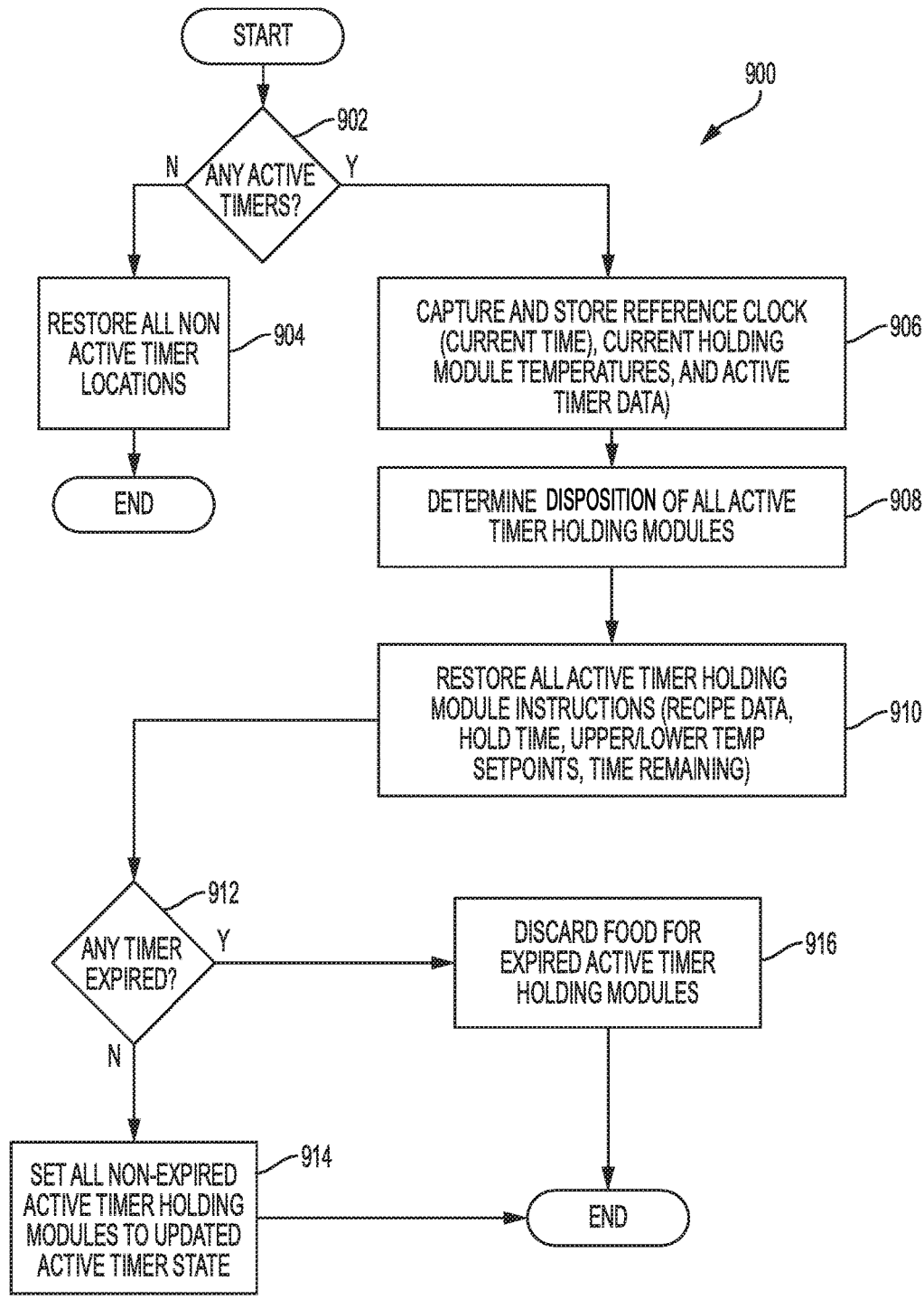
FIG. 9 is a flowchart of a method for power recovery for a modular holding bin.

The timing module 804 and the temperature module 806 are used, along with the recovery control module 808, in a power recovery mode of the modular holding bin as shown in FIG. 9.

When power is lost to the modular holding bin or any particular holding module that is condition is called a "power fault condition." Typically, power is lost to the entire modular holding bin, therefore we describe example operations for that situation. Other power fault conditions, however, are contemplated and resolvable by the present techniques as well.

When a power fault condition occurs and power is lost to the modular holding bin, e.g., bin 100, all active timers in the holding modules will cease to operate. All heaters will cease to operate as well, and the temperature in the holding module will begin to drop. Upon power restart, when power is restored, the time module 804 determines an amount of time since the power was lost, i.e., the amount of time since the power fault condition occurred. The total time of the power fault condition, from start until the time power is sufficiently restored, is called the "power fault window."

During the power fault window, in the illustrated example of FIG. 8, the reference clock/timer, with auxiliary power source, is still maintained in operation. That is, the master controller is still recording its reference clock/timer. When power is restored, the master controller enters a new discovery mode, as discussed hereinabove, where the master controller (302) discovers the presence of the holding units (304-308) and any expansion controllers (318 and 320). The locations of the holding hunts identified and their data tables are filled. From here, the power recovery 800 is activated and captures the current reference time/clock from the reference clock/timer. For example, the time module 804 may access the reference time/clock for its current value. The timing module 804 then determines if there are any active timers, which can be done by checking for any timer data in the timing module 804 showing timers that still have time remaining, upon power restart. If there are any active timers, that means that the timers, and corresponding holding modules, running at the time of the power fault condition. In the power recovery process 900 in FIG. 9, this determination is shown at block 902. The block 902 is described as performed by the timing module 804, but in other examples, the determination is made by the recovery control module 808 or other module in the power recovery module 800 or elsewhere in the master controller.

While the examples of FIGS. 8 and 9 are described in reference to a reference clock/timer operating on the master controller, in other examples, the reference clock/timer can be a global clock value obtained from an external time source coupled to the module 800 through an optional communication interface module 810. For example, a time module may be configured to obtain the current global time from an external computer server coupled through a wired or wireless network coupled to the communication interface module 810. In such examples, that external clock may be used during normal powered on operation of the modular holding bin, continuously or periodically receiving a global clock value from the external source and using that global clock value for time stamp purposes.

In FIG. 9, if the timing module 804 determines that there were no active timers at the time of power restart, then no timer recovery operation is employed, and control is passed to a block 904, in which the recovery control module 808 gathers all last known used recipes stored in the recipe module 802 and all the holding module location data stored in the master controller. From this information, the recovery control module 808 instructs the master controller to send all recipe data, e.g., as recipe images to the holding modules. The recovery control module 808 instructs the master controller to send all recipe timer data (also termed hold time data) to the respective holding modules, along with the upper and lower setpoint temperature data. The process 900 then ends.

If the timing module 804 determines there are active times, then control is passed to a block 906, in which current timing and temperature date is captured and stored. The block 906 determines which holding modules have active timers, which are the holding modules that need recovery. For example, the timing module 904, which has previously stored time remaining data, obtains the last logged time remaining data (with time stamp) for all active holding modules. The timing module 904 obtains the reference clock/timer data and determines the elapsed time since the power fault condition, by subtracting from the current reference clock/timer value, which in this example is a system time, the last logged timed value, namely the time stamp of the last logged time remaining data. This time may also be called the last time due to power outage.

From this data, the timing module 804 then determines for each holding module, the recalculated time remaining for the respective recipes. This time remaining value may be determined by subtracting the time of the power fault window, i.e., the lost time due to power outage, from the last logged timing remaining value.

The time comparison identifies which holding modules have active timers, this data is identified to the recovery control module 808, which then instructs the temperature module 806 to obtain current temperature data from the identified holding modules.

For example, the time module 806 requests current temperature heating data for the upper and lower heater elements in each of the active timer holding modules by instructing the master controller to send a request signal on the CAN peripheral busses to each of the active time holding modules. The active timer holding modules respond by sending temperature data from temperature sensors 516A and 516B to the master controller which sends it to the temperature module 806.

In other examples, the temperature module may be configured to determine the current holding temperature algorithmically, by receiving time lost data from the time module 804 and. The temperature module may then determine, for example using stored thermal coefficient data for various food products types, sizes, etc., the expected current temperature of the stored food based on a projected (or stored) temperature at the time of the power fault condition and the amount of time since the power fault condition.

At a block 908, the recovery control module 808 determines a disposition of the active timer holding modules based on the determined timing data and current temperature data. That is, the recovery control module 808 can determine the impact of the power fault on operation of each holding module in the modular holding bin. The recovery module 808 determines whether the conditions of the power fault condition and power fault window are such that the product/food in each of the holding modules affected by the power fault condition (i) can be retained or (ii) should be discarded.

In an example, at the block 908, the module determines if any of the active timers have expired, that is, if the lost time of the power fault window is greater than the most recently logged time remaining value stored before the power fault condition. If any of the timers are expired, then the recovery module 808 flags the corresponding holding modules, or more specifically, flags a stored data field therein for each of the expired holding modules.

For any holding modules that have non-expired active timers, at block 910 the recovery control module 808 restores all recipe images and or names, by instructing the master controller to send recipe data to these active timer holding modules. That includes, sending the total recipe time, i.e., the total hold time, the upper and lower temperature setpoint temperatures and determining and sending updated time remaining data to all expired active timers. Note, at the block 910, the module 808 may also restore the recipes for all non active holding modules that were identified at block 902 as not having any active time at the time of the power fault condition.

At a block 912, the recovery module 808 identifies which holding modules were flagged as having an expired timer. At a block 914, the recovery module 808 generates a fault instruction for each such module and instructs the master controller to send that fault instruction to each such module. The receiving holding module displays the a fault indication on the display of the module, identifying the operate that the contents in the holding module should be disposed. In some examples, the holding module will display a fault indication and await a user input, such as a pressing the push button display itself, acknowledging the push button. After acknowledgement is received and communicated back to the master controller on the CAN peripheral bus, the recovery module 808 clears the active timer flag.

For holding modules that were not flagged has having non-expired active timers, at a block 916, the recovery module 808 instructs the master controller to transmit the updated active time remaining data to the holding modules, for example, sending that update on the CAN peripheral. The holding modules will display the updated time remaining, recalculated by the timing module 804 to compensate for the time lost during the power fault window. The holding modules display the updated time remaining data as timer data on their displays, indicating the user how much time is left before the recipes is completed.

In some examples, the recovery control module 808 determines which holding modules have expired active timers, not only from the timer data determined upon power recovery and the current temperature values, but also based on a tunable parameter that may be stored in the recipe module 802. That tunable parameter represents an expiration time for a specific recipe to be applied when the power is lost. The tunable parameter may be stored for each recipe in the recipe module 802 and the tunable parameter may be adjusted by the a programmer. In this example, if the time lost is greater than the tunable recipe expiration value, then the recovery control module 808 determines that the active timer for the holding module is to be stopped and the food/product is to be discovered according to block 914. If the total time loss is less than the tunable expiration value, then recipe is loaded into the holding machine by the master controller, at block 916 and an timer active indicator is sent to the holding module.

Figure 10:
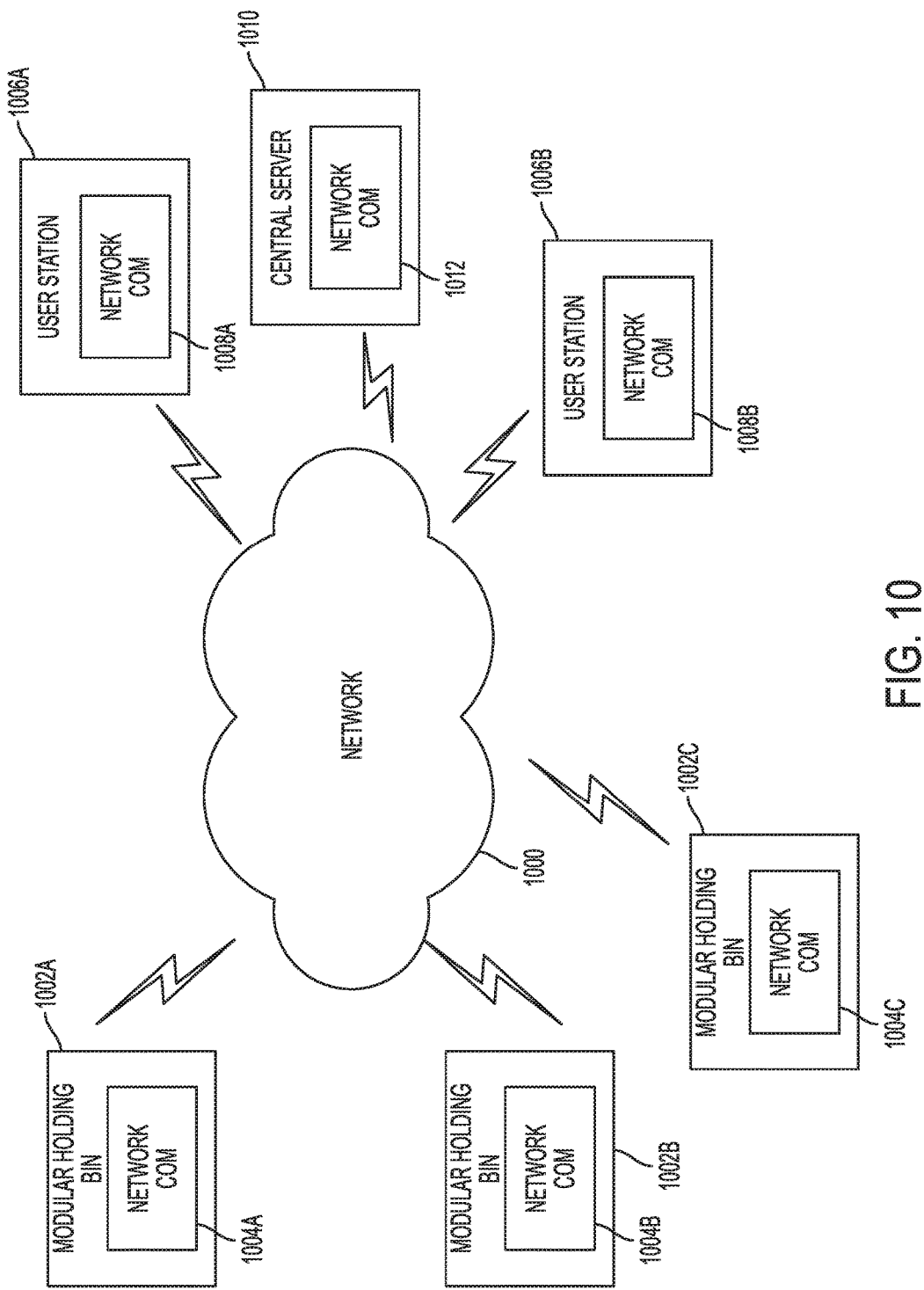
FIG. 10 is a diagram of a network architecture that includes a central server station and a plurality of user stations and module holding bins, where the user stations are able to provide tunable parameters to the module holding bins.

FIG. 10 illustrates an example network 1000 for use in programming operation of a remote modular holding bins, such as those described hereinabove. The network 1000 can be any suitable local or wide area network(s) including a Wi-Fi network, a Bluetooth network, a cellular network such as 3G, 4G, Long-Term Evolution (LTE), the Internet, etc. The network 1000 may be a wireless network or a wired network. The network 1000 communicates with a plurality of modular holding bins 1002A-1002C, three of which are shown for example purposes, but which would include more modular holding bins in a typical networked environment. Each modular holding bin 1002A-1002C may hold an array of holding units (holding modules), as discussed, for example, in reference to FIGS. 1-3 above. Further each modular holding bin 1002A-1002C may be located in remote locations from each other, such as at different food service stores for a given user, or customer. The modular holding bins 1002A-1002C each include a network interface controller 1004A-1004C providing communications with the network 1000.

User stations 1006A and 1006B are coupled to the network 1000 through respective network interface controllers 1008A and 1008B. A central station 1010 is also coupled to the network 1000 through a network interface controller 1012. The central station 1010, which includes one or more processors and one or more computer-readable mediums, stores programming instructions that the station 1010 sends to the modular holding bins 1002A-1002C over the network 1000. Those programming instructions can include, for example, instructions for executing a discovery mode using a master base controller, as described herein, recipe instructions to be stored and executed by the holding modules within the modular holding bins, instructions for a power recovery mode using a master base controller, as also described herein, and other instructions.

The central station 1010 also provides communication with the user stations 1006A and 1006B through the network 1000. In some examples, that communication provides recipe instructions and other instructions that are executed on the user stations 1006A and 1006B to allow an operator at the user station to adjust the instructions, also termed "tuning" the instructions, before the instructions are sent to the modular holding bins 1002A-1002B for execution.

Figure 11:
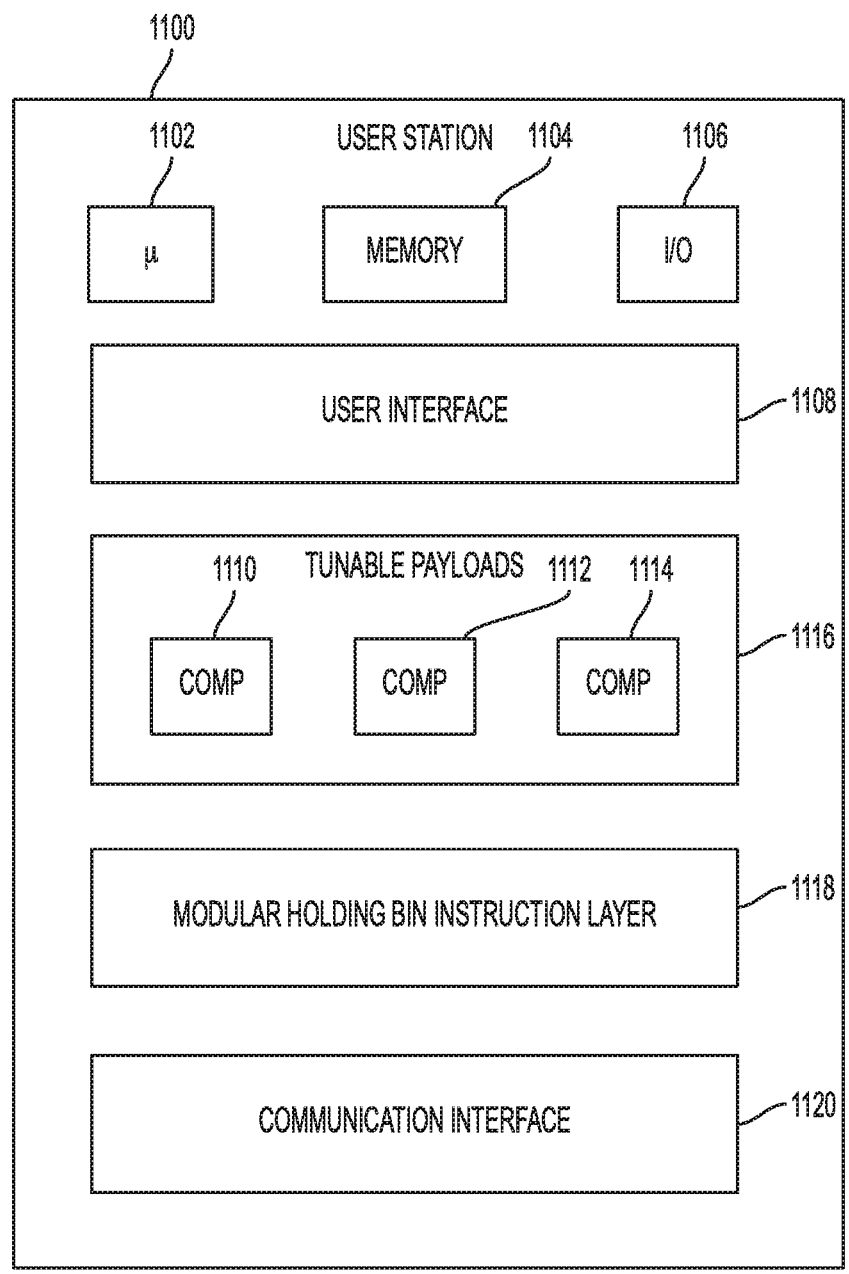
FIG. 11 is a block diagram of an example user station from the network architecture of FIG. 11.

FIG. 11 illustrates an example user station 1100 as may be implemented as the user stations 1006A and 1006B in FIG. 10. The user stations 1100 includes one or more processors (CPU) 1102, one or more memories 1104, and an input/output (I/O) module 1106. The one or more memories 1104 may include a tangible, non-transitory memory and may include any types of suitable memory modules, including random access memory (RAM), read only memory (ROM), flash memory, other types of persistent memory, etc. The memory 1104 stores an operating system (OS) and one or more modules. The operating system may be any type of suitable operating system. The I/O module 1106 may be a keyboard or a touchscreen, for example.

For illustration purposes, the user station 1100 is depicted including a user interface module, which may be stored in the memory 1104 or stored separately, and which represents a user interface layer that presents a graphical user interface to an operator, allowing that operator to individually adjust, or "tune," different payload components 1110, 1112, and 1114 in a tunable payload layer 1116. The tuned payload components 1110, 1112, and 1114 are provided to a modular holding bin instruction layer 1118 that can include recipe instructions, discovery mode instructions, power recovery mode instructions, and other instructions received from the central station 1010. The tuned payload components may be published into the modular holding bin instruction layer 1118 by the operator after the operator has adjusted respective aspects of one or more of those components. The result is a tuned modular holding bin instruction data set that is then communicated to whichever of the modular holding bins 1002A-1002C correspond to the particular user station 1100, e.g., through a network communication interface layer 1120. In this way, any user station coupled to the network 1000 is able to remotely program instructions into their corresponding modular holding bins. Moreover, any user station can program multiple modular holding bin by broadcasting tuned instructions to all their modular holding bins connected to the network 1000 in a simultaneously broadcasted manner, thereby greatly reducing recipe updates and modular holding bin downtime.

The tunable payload components 1110, 1112, and 1114 may represent N number of tunable components, where N is equal to or greater than 1. Each component 1110, 1112, and 1114 may represent one or more variables used in the programming instructions of a modular holding bin. Each payload component 1110, 1112, and 1114 may represent a category of tunable instructions, such as shown in FIGS. 12-14.

Figure 12:
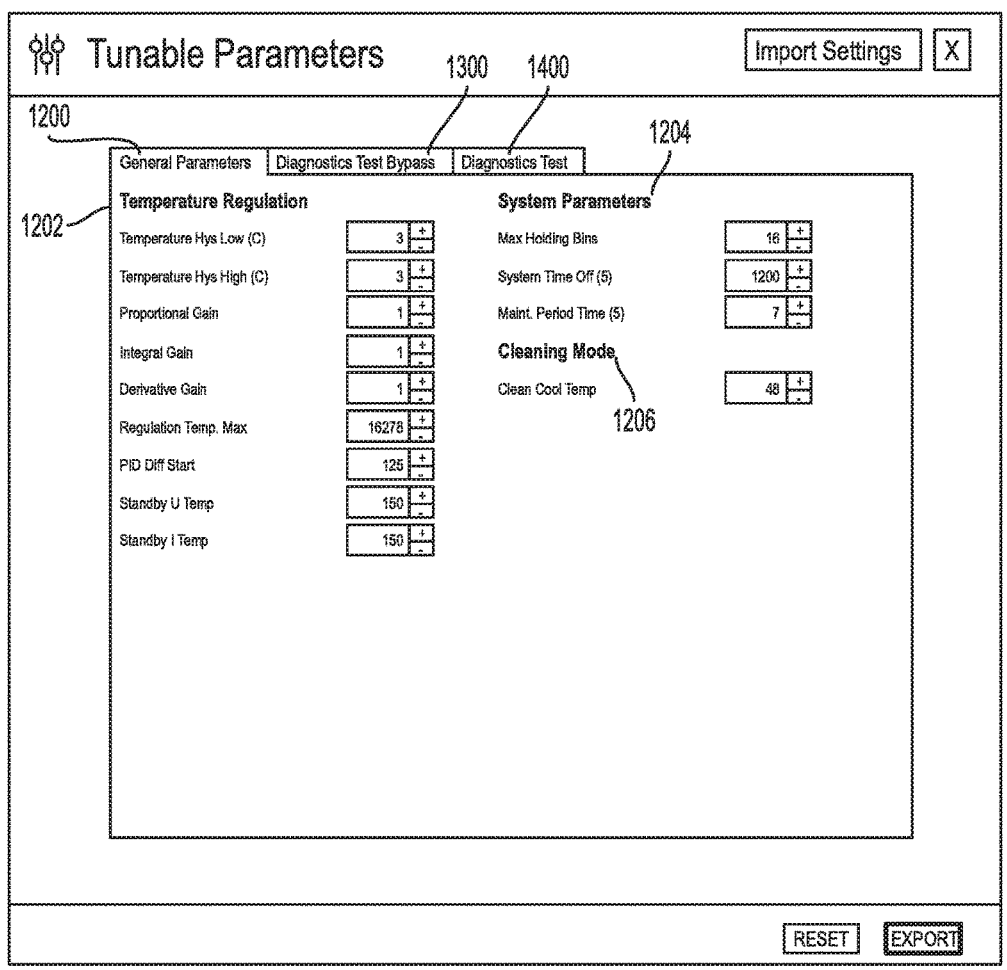
FIGS. 12-14 illustrate example graphical user interfaces for different tunable parameters (general parameters, diagnostic test bypass parameters, and diagnostic test parameters, respectively).

FIG. 12 is a graphic user interface showing tunable "General Parameters" 1200 that form a first tunable payload component (such as payload component 1110). The General Parameters 1200 include tunable Temperature Regulation parameters 1202, tunable System Parameters 1204 and a tunable Cleaning Mode Parameter 1206. For each of the illustrated parameters, the user is provided with a tuning button for increasing or decreasing the associated tunable value.

Figure 13:
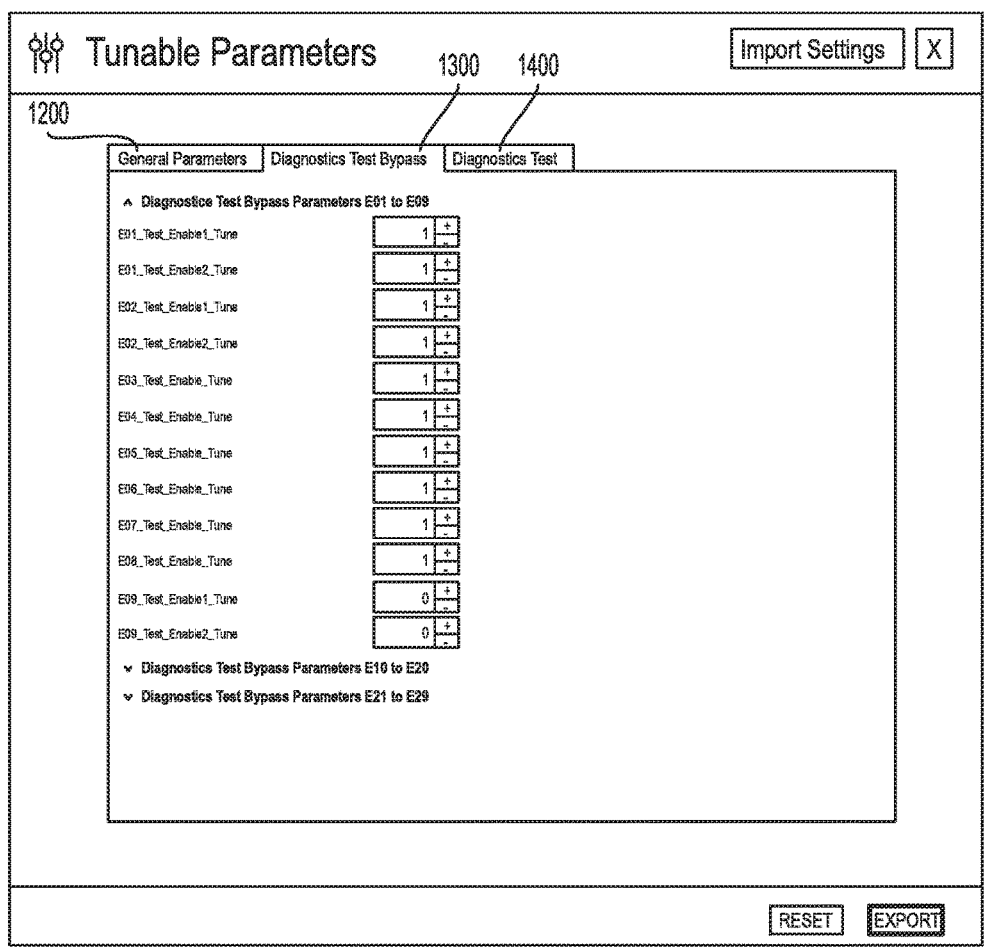

FIG. 13 is a graphic user interface showing tunable "Diagnostics Test Bypass Parameters" 1300 that form a second tunable payload component (such as payload component 1112). The Diagnostics Test Bypass Parameters 1300 include tunable parameters for instructing a modular holding bin to bypass different aspects of a diagnostic test performed, e.g., during initial power startup of the modular holding bin. For each of the illustrated parameters, the user is provided with a tuning button for increasing or decreasing the associated tunable value.

Figure 14:
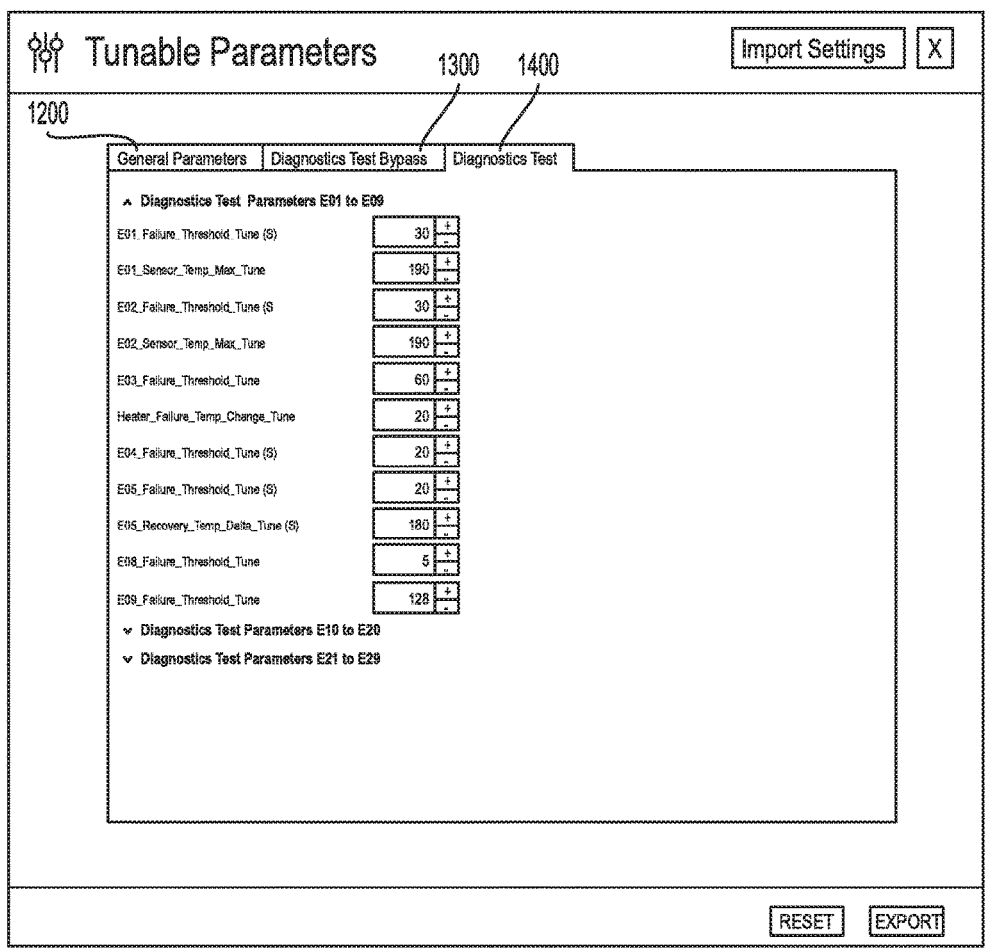

FIG. 14 is a graphic user interface showing tunable "Diagnostics Test Parameters" 1400 that form a third tunable payload component (such as payload component 1114). The Diagnostics Test Parameters 1300 include tunable parameters for use by a modular holding bin in performing a diagnostic test, e.g., during initial power startup of the modular holding bin. For each of the illustrated parameters, the user is provided with a tuning button for increasing or decreasing the associated tunable value.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connects the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of the example methods described herein may be performed, at least partially, by one or more processors that are temporarily configured (e.g., by software) or that are permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or by processor-implemented hardware modules. The performance of certain of the operations may be distributed among the one or more processors, not only residing within a single machine, but also deployed across a number of machines. In some example embodiments, the processor or processors may be located in a single location (e.g., within a hospital, within a home environment, an office environment or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a hospital, within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as an example only and does not describe every possible embodiment, as describing every possible embodiment would be impractical, if not impossible. One could implement numerous alternate embodiments, using either current technology or technology developed after the filing date of this application.

The foregoing description is for purposes of illustration only. The true scope of the invention is set forth in the following claims.

What is claimed is:

1. A modular food holding bin apparatus comprising:
a plurality of individually controllable and individually configurable food holding units:
a master base controller coupled to each of the plurality of food holding units through a communication bus architecture, the master base controller, the master base controller having at least one processor and at least one memory;
the master base controller being configured to:
upon recovery of power after a power fault condition, determine, in a power recovery module of the master base controller, a time associated with the power recovery, the master base controller being a processing device coupled to control the plurality of food holding units;
determine, in the power recovery module, a fault time indicating an amount of lost time between the power fault condition and the power recovery;
in response, to the fault time determination, determine a timer status for each of the food holding units; and
for the food holding units determined to have an expired active timer status after the power recovery, send a food expiration instruction to the food holding units; and
for the food holding units determined to have an active time status after the power recovery, send an updated operating instruction to the food holding units, the updated operating instruction including timing data for completing a recipe on the food holding units.

2. The modular food holding bin apparatus of claim 1, wherein the power recovery module is configured to:
upon power recovery from a power fault condition, determine, a time associated with the power recovery;
determine a fault time indicating an amount of lost time between the power fault condition and the power recovery;
in response, to the fault time determination, determine a timer status for each of the food holding units; and
for the food holding units determined to have an expired active timer status after the power recovery, send a food expiration instruction to the food holding units; and
for the food holding units determined to have an active time status after the power recovery, send an updated operating instruction to the food holding units, the updated operating instruction including timing data for completing a recipe on the food holding units.

3. The modular food holding bin apparatus of claim 1, wherein the master base controller module is configured to, for the food holding units determined to have an inactive time upon the power recovery, send a stored recipe data to the food holding units.

4. The modular food holding bin apparatus of claim 1, wherein the power recovery module is configured to, determine the time associated with the power recovery by determining a reference time associated with the power recovery.

5. The modular food holding bin apparatus of claim 4, wherein the power recovery module is further configured to:
determine a last logged time remaining data for each of the food holding units having an active timer; and
determine the fault time comprises determining a difference between reference time associated with the power recovery and the last logged time remaining data for each of the food holding units.

6. The modular food holding bin apparatus of claim 4, wherein the power recovery module is configured to, determine the reference time associated with the power recovery from an auxiliary powered clock on the master base controller.

7. The modular food holding bin apparatus of claim 1, wherein the power recovery module is configured to determine a current temperature for each of the food holding units having an active time after power recovery.

8. The modular food holding bin apparatus of claim 7, wherein the power recovery module is configured to determine status for each of the food holding units based on the fault time determination and the current temperature for each food holding unit and the food or product in each food holding unit at the time of the power fault condition.

9. The modular food holding bin apparatus of claim 1, wherein the power recovery module is configured to determine status for each of the food holding units based on a tunable expiration parameter for each of the holding units.

10. The modular food holding bin apparatus of claim 9, wherein the master base controller is configured to, for the food holding units determined to have an expired active timer status after the power recovery, send the food expiration instruction to the food holding units using a multi-master, multi-point communication protocol bus.

11. The modular food holding bin apparatus of claim 10, wherein the multi-master, multi-point communication protocol of the first bus is a Controller Area Network (CAN) communications protocol.

12. The modular food holding bin apparatus of claim 1, wherein the master base controller is configured to, for the food holding units determined to have an active time status after the power recovery, send the updated operating instruction to the food holding units using a multi-master, multi-point communication protocol bus.

13. The modular food holding bin apparatus of claim 12, wherein the multi-master, multi-point communication protocol of the first bus is a CAN communications protocol.

* * * * *